United States Patent
Vossen et al.

(10) Patent No.: US 8,041,666 B2
(45) Date of Patent: Oct. 18, 2011

(54) METHOD AND APPARATUS FOR GENERATION OF A SEQUENCE OF ELEMENTS

(75) Inventors: Marcus Petrus Hendrica Vossen, De Bilt (NL); Steffen Clarence Pauws, Eindhoven (NL); Wilhelmus Franciscus Johannes Verhaegh, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 940 days.

(21) Appl. No.: 11/994,425

(22) PCT Filed: Jul. 4, 2006

(86) PCT No.: PCT/IB2006/052240
§ 371 (c)(1),
(2), (4) Date: Jan. 2, 2008

(87) PCT Pub. No.: WO2007/004192
PCT Pub. Date: Jan. 11, 2007

(65) Prior Publication Data
US 2008/0208775 A1    Aug. 28, 2008

(30) Foreign Application Priority Data
Jul. 6, 2005  (EP) .................................... 05106125

(51) Int. Cl.
*G06F 17/00* (2006.01)
*G06N 5/02* (2006.01)
(52) U.S. Cl. .............................. 706/47; 706/46; 706/12

(58) Field of Classification Search ................ None
See application file for complete search history.

(56) References Cited

U.S. PATENT DOCUMENTS
6,430,573 B1    8/2002  Pachet
2004/0131333 A1 7/2004  Fung FOREIGN PATENT DOCUMENTS
WO   WO2004008460 A1   1/2004
WO   WO2004057495 A1   7/2004

OTHER PUBLICATIONS
Burton et al., A., "Generation of Musical Sequences with Genetic Techniques", Computer Music Journal, pp. 59-73, 1999.*

(Continued)

*Primary Examiner* — Jeffrey A Gaffin
*Assistant Examiner* — Adrian Kennedy
(74) *Attorney, Agent, or Firm* — Sherry Womack (57) ABSTRACT

A method and apparatus for automatically generating a target sequence of a plurality of elements selected in accordance with a plurality of user-defined constraints such as a play list of songs. The apparatus comprises a user interface (102) for inputting a plurality of user-defined constraints, a storage device (106) for storing a plurality of elements or music files; and a processor (104) for automatically generating the target sequence or play list by an iterative process in which a solution sequence is found at each iteration to best fit the user-defined constraints. A small, random or biased change is made to the sequence found and if this improves the solution, the new solution is used for the next iteration. The biased change is used to help predict a better result for user-defined constraints which are, ordinarily, difficult to satisfy.

21 Claims, 1 Drawing Sheet

OTHER PUBLICATIONS

Tokui et al., N., "Music Composition with Interactive Evolutionary Computation", pp. 1-11, 2000.*

Biles, J., "GenJam: A Genetic Algorithm for Generating Jazz Solos", pp. 1-7, 1994.*

Shardanand, U., "Social Information Filtering for Music Recommendation", Massachusetts Institute of Technology, pp. 1-93, Sep. 1994.*

J. Aucouturier et al., "Scaling Up Music Playlist Generation", Multimedia and Expo, 2002, ICME '02 Proceedings, IEEE Int'l Conference on Lausanne, Switzerland, Aug. 2002, IEEE, US, Piscataway, NJ, vol. 1, Aug. 26, 2002, pp. 105-108, XP010604317.

S. Paues et al., "Realization and User Evaluation of an Automatic Playlist Generator", Journal of New Music Research, Swets & Zeitlinger, vol. 32, No. 2, Jun. 2003, pp. 179-192, XP.

F. Pachet et al., "A Combination Approach to Content-Based Music Selection", Proceedings of the IEEE Multimedia Computing and Systems Int. Conf., Firenze, Italy, pp. 457-462.

P. Herrera et al., "The Cuidado Project", IUA-Universitat Pompeu Fabria, Barcelona, Spain, pp. 1-7, 2002.

* cited by examiner

FIG. 1

METHOD AND APPARATUS FOR GENERATION OF A SEQUENCE OF ELEMENTS

TECHNICAL FIELD

The present invention relates to a method for generation of a sequence of elements. In particular, but not exclusively, it relates to a method for the automatic generation of a playlist of multimedia files such as music files.

BACKGROUND OF THE INVENTION

Many people store multimedia files, such as music, on their computers in MP3 or WMA format or the like. These files can be played in any order selected from the entire collection. These multimedia files may be played on the computer, DVD players, car stereos, and other portable players such as specialized MP3 players.

Typically, it is desirable to make a playlist that is basically a list that defines which multimedia files (e.g. songs) to play in which order. Such a list can be created manually by adding songs to the playlist one by one. However, this is a very tedious, especially if the collection of music files is extensive. A much simpler way to create a playlist is to let the player randomly play songs from the entire, or a part of the, music collection. However, usually playlists are created with a special purpose in mind, for example to listen to while relaxing or while driving the car etc. In these cases, the listener, invariably, wants to be able to specify more precisely what type of music is played. Therefore, it is desirable that the music player generates a playlist automatically, or at least assists the listener in doing so, in accordance with the listener's specific desires.

There are several known types of automatic playlist generators. One known system learns the user's preference for songs and subsequently generates a set of songs that the system thinks the user would enjoy. In determining which songs the user would like there are two different approaches: content-based learning and collaborative filtering. Content-based learning looks at the songs themselves and at the attributes of those songs in particular and matches songs that are similar according to their attributes. The idea is that if a user likes a particular song, the user will also like a song that is similar to it. The input from the user for these systems usually consists of one or more seed song and the system then outputs a set of songs that are similar to the seed song(s). Because the song order is not taken into account and the user cannot specify other constraints than that the songs in the list should be similar to the seed song, this system has very limited use.

Collaborative filtering is a multi-user approach that utilizes explicit preferences to match songs to a specific user. Each user expresses their preferences for a set of songs. The system then tries to expand this set of preferred songs by finding users that have a similar taste in music and recommending the songs that these users have indicated to like. The playlists that are generated by this system are actually playsets since the song order is not taken into account or is considered a matter of minor importance and again the system has limited use.

The main objective of the above systems is to introduce new music to the users; they do not offer the user assistance in creating a specific playlist for a specific situation.

Another known method is to provide a solution playlist on the basis of constraints defined by the user that have to be satisfied, and operated in a network. Each node in the network represents a song, costs and weights to represent the constraints that have to be satisfied. The object is to find a continuous path connecting the source and the sink (the first and the last song in the playlist, respectively, which could be dummy songs) that has a minimum cost and at the same time has constrained weights. In the model, songs are represented as vectors of binary values, which limits the attributes and hence constraints that can be defined Another known playlist generator uses a constraint satisfaction programming (CSP) method. CSP associates a constrained variable with each position in the playlist, where the domain of each of the variables is the music collection. The idea is to assign a value from the domain to each of the variables, which corresponds to a sequence of songs. However, the number of songs in the playlist is fixed by defining the variables in the CSP, and therefore does not allow the user to define the duration of the playlist they desire for example. The algorithm, which searches for a solution, consists of reducing each domain one after the other, until it either leads to a solution or fails to find one. Every time a value is removed from a domain, the constraints acting on this domain are inspected to check if any constraint implies that another value, belonging to another domain, becomes forbidden. If so, it is removed too, and the process is repeated recursively (constraint propagation). Domain reduction then occurs either by choice (assigning a value to a variable), or as consequence of the propagation required for the satisfaction of some constraints. Upon failure (a domain becomes empty), the algorithm backtracks to the last decision that was made, takes a different one, and tries again. If there's no solution either, the algorithm backtracks one step further, and examines the stack of decisions bottom to top until it can either prove that there's no solution, or find one. So the solution playlist is constructed by repeatedly adding songs to the playlist and testing if the playlist can still be completed. Therefore, only a partial playlist is available at each iteration, which may be problematical if the algorithm is stopped prematurely. This CSP algorithm is, therefore, complex and as a result has limited scalability. Further, the CSP algorithm does not incorporate a notion of optimality which is desirable for playlist generation.

Another known technique for automatic playlist generation is a local search method. The method starts with a random list of songs and iteratively tries to improve upon this playlist by making small changes such as (i) adding a song, (ii) deleting a song, (iii) replacing a song by a new one, and (iv) swapping two songs in the playlist. To achieve this a cost is associated with the playlist and the more constraints that are violated (not satisfied) by the playlist and the larger that violation, the higher the cost. The local search is an iterative process in which, at each iteration, the resulting playlist of the previous and current iterations are compared and the resulting playlist with the lower cost becomes the result of the current iteration. Therefore, at any time, there is a complete solution playlist, and it is possible to stop the algorithm at any time to return the best playlist found so far, i.e. the latest result. The algorithm does not investigate all possible playlists but progressively refines solutions and consequently has a better scalability and incorporates optimality.

However, if a particular constraint is hard to satisfy, randomly generating a new solution (making a small random change) and checking whether the violation has decreased, is likely to lead to rejection of the current solution and the search algorithm will make very little progress and will become extremely slow.

An example of constraints that are hard to satisfy by randomly changing the original solution is the constraint that we want to have three songs of a certain artist, when the current solution has two. Replacing a song by a random other song will then have a very low probability of being of the right artist, and hence the new solution will most likely also not have three songs of this artist.

THE INVENTION

The invention relates to a more effective way of generating a sequence of elements which is fast, efficient and effective. Ideally the method and apparatus for generating a sequence of elements according to the present invention has optimization such that if there are conflicting constraints, which would entail that there is no playlist that satisfies all constraints, the algorithm should generate a playlist that satisfies the constraints as much as possible; includes incremental calculation such that the user can at any time retrieve a solution sequence and allow the user to alter the sequence and such that the algorithm is able to use previous iterations in the construction of new sequences to improve efficiency and the quality of the target sequence; minimal latency; and scalability such that any increases in the length of the target sequence, the number of source elements from which the element are selected for the target sequence, or the number of user-defined constraints does not result in an exponential increase in execution time.

According to an aspect of the present invention, there is provided a method for the generation of a target sequence of a plurality of elements selected in accordance with a plurality of user-defined constraints, the method comprising the steps of: (a) generating a first sequence of the selected elements; (b) evaluating a penalty of the first sequence as to whether the selected elements of the first sequence meet the plurality of user-defined constraints; (c) making a change to at least one element of the first sequence to generate a second sequence, the change including at least one of (i) a random change and (ii) a biased change, the biased change reducing the penalty of at least one of the plurality of user-defined constraints; (d) evaluating a penalty of the second sequence as to whether the selected elements of the second sequence meet the plurality of user-defined constraints; (e) if a random change is made in step (c) the penalties of the first and second sequence are compared and one of the first and second sequence is selected as target sequence in dependence on said penalties, if a biased change is made in step (c) the second sequence is selected as the target sequence or the penalties of the first and second sequence are compared and one of the first and second sequence is selected as target sequence in dependence on said penalties; and (f) repeating steps (c) to (e), the target sequence found in step (e) replacing the first sequence of step (c) for each iteration such that at least one iteration includes making a biased change. In step (e), often, the sequence with the least penalties is selected, but simulated annealing may be used to escape local maxima.

According to a second aspect of the present invention, there is provided a device for automatically generating a target sequence of a plurality of elements selected in accordance with a plurality of user-defined constraints, the device comprising: a user interface for inputting a plurality of restrictions for the target sequence and translating the restrictions into a plurality of user-defined constraints; a storage device for storing a plurality of elements; and a processor for automatically generating the target sequence according to the steps of: (a) generating a first sequence of the selected elements; (b) evaluating a penalty of the first sequence as to whether the selected elements of the first sequence meet the plurality of user-defined constraints; (c) making a change to at least one element of the first sequence to generate a second sequence, the change including at least one of (i) a random change and (ii) a biased change, the biased change reducing the penalty of at least one of the plurality of user-defined constraints; (d) evaluating a penalty of the second sequence as to whether the selected elements of the second sequence meet the plurality of user-defined constraints; (e) if a random change is made in step (c) the penalties of the first and second sequence are compared and one of the first and second sequence is selected as target sequence in dependence on said penalties, if a biased change is made in step (c) the second sequence is selected as the target sequence or the penalties of the first and second sequence are compared and one of the first and second sequence is selected as target sequence in dependence on said penalties; and (f) repeating steps (c) to (e), the target sequence found in step (e) replacing the first sequence of step (c) for each iteration such that at least one iteration includes making a biased change.

In this way, the iterative process of the method and apparatus of the present invention according to the above aspects provides optimization, incremental calculation and scalability. The biased change reduces the time taken by the iterative process for user-defined constraints that are difficult to satisfy by the random change, thus improving latency of the process.

Preferably, steps (c) to (e) are repeated, until the penalty of the target sequence is minimized or are repeated a predetermined number of times.

Therefore, for user-defined constraints that are difficult to satisfy by making random changes such as the user-defined constraint described below with reference to the detailed description of the preferred embodiment of the present invention. Due to the biased change, a solution sequence of elements can be found which would be difficult and time consuming if using the random change. One way in which this can be achieved is determining the biased change user-defined constraint votes.

Changing at least one element of the first sequence may include at least one of: changing the position of the at least one element in the sequence, replacing the at least one element with a new element, deleting an element, inserting a new element. The new position of the at least one element may be selected by voting of a plurality of user-defined constraints and/or the new element may be selected by voting of a plurality of user-defined constraints. Only a predetermined subset of the plurality of user-defined constraints may vote. For example, those user-defined constraints that are difficult to satisfy using a random change method.

The user-defined constraints can be weighted such that the penalty of a user-defined constraint is calculated on the basis of the weighted constraints.

Preferably, the elements are stored in a library and each element selected for the first and second sequence are selected from the library. The elements selected from the library may be selected from a subset of the library defined by at least one user-defined constraint.

The elements of the first sequence may be selected on the basis of similarity to a seed element.

The target sequence may comprise a sequence of elements arranged in a predetermined order in accordance with at least one user-defined constraint.

The target sequence may be a music playlist and the elements music files.

BRIEF DESCRIPTION OF DRAWINGS

For a more complete understanding of the present invention, reference is made to the following detailed description taken in conjunction with the accompanying drawing, wherein.

DETAILED DESCRIPTION OF PREFERRED EMBODIMENTS

A preferred embodiment of the present invention will now be described with reference to FIG. 1. Although the preferred embodiment describes generation of a music playlist, it can be appreciated that the present invention can be utilized for the generation of a sequence of elements such as multimedia files or the like.

When users want to express which songs should be in the list they could just give the title and the artist of each song. However, people do not always know which specific songs they want to hear, because they do not remember the title of the song or they cannot explicitly express the songs they want to hear in a certain situation. Such a listening situation is, for example, determined by the mood of the person (happy or sad), the environment (sitting alone in the living room or having a party in the garden), or the listening purpose (relaxing or inciting). Therefore, we need to have more information on the songs to enable a user to express her musical preference in a more general fashion. Instead of saying that he wants to hear "Radar Love" by "Golden Earring" the user could express that they want "a fast rock song".

Table 1 below shows an example of possible attributes to describe a song.

TABLE 1

| attribute | Description | type | example |
|---|---|---|---|
| song ID | a unique identifier | nominal | 101 |
| title | the title of the song | nominal | Dancing Queen |
| artist | the name of the performing artist | nominal | ABBA |
| album | the name of the album of the song | nominal | Greatest Hits |
| track | the track number of the song on the album | numerical | 1 |
| duration | the duration of the song (in seconds) | numerical | 232 |
| file size | the size of the file of the song (in MB) | numerical | 3.63 |
| genre | the genre to which the song belongs | categorical | popular |
| year | the year the song was released | numerical | 1975 |
| tempo | the tempo of the song (in beats per minute) | numerical | 100 |
| tempo marking | the description of the tempo of the song | ordinal | medium |
| mood | the overall mood of the song | categorical | happy |
| key | the tonality of the song | categorical | G major |

Values are given for example song "Dancing Queen" by "ABBA". Each attribute has a type that defines how the values of that attribute can be compared. Attributes can be nominal, categorical, ordinal, numerical, or a set of any of these types.

Song ID, artist, title, and album are examples of nominal attributes. These attributes can be defined in terms of equivalence (for example, these two songs are by the same artist) and set membership (for example, that song is by a Dutch artist). Some hierarchy is defined on the values of categorical attributes. So in addition to equivalence and set membership, this hierarchy allows partial order relationships on the values. Genre and mood are examples of categorical attributes. For example, the genre "Britpop" is a sub-genre of "Popular", so any song that belongs to "Britpop" also belongs to "Popular". In addition to equivalence and set membership, as for nominal attributes, a total order is defined on ordinal values. This is in contrast to the categorical attributes, on which the order is only partial. The total order can be used to express that a value is less than another value. For example, for tempo markings, a song with a "slow" marking is slower than one with a "fast" marking. The numerical type extends the ordinal type with a difference between the values. Release year and duration are examples of numerical attributes. For example, the user could specify that one song is ten years older than another song.

The order of the songs within the playlist may also be important. For example, a DJ chooses songs for playing in a club so as to make a smooth transition from one song to the other. Therefore, the tempo of the songs should not be too different. Another aspect of the importance of the order of the songs in a playlist is balance. If, for instance, there are multiple songs in the playlist by the same artist, a more balanced playlist would not have these songs played one after another. Instead, it might be desirable to include a couple of songs by a different artist. Users may also want to indicate a certain progression in the music. For example, they may wish to start off the sequence with some slow songs and then increase the tempo.

Further a user may wish to specify the length of a playlist either in terms of the number of songs or the total duration of the playlist in minutes or hours. For example, the user may desire a playlist of about one hour because that is how long the drive to work takes. Another possibility might be that a portable MP3 player has limited storage capacity. In that case the user may wish to indicate the amount of storage the playlist takes up on the device, for example 256 MB.

Therefore, it is desirable that the playlist generator considers different types of user preferences or restrictions to be as flexible and useable as possible. The user's preference or restrictions are formalized in the system of the preferred embodiment as user-defined constraints.

Figure 1:
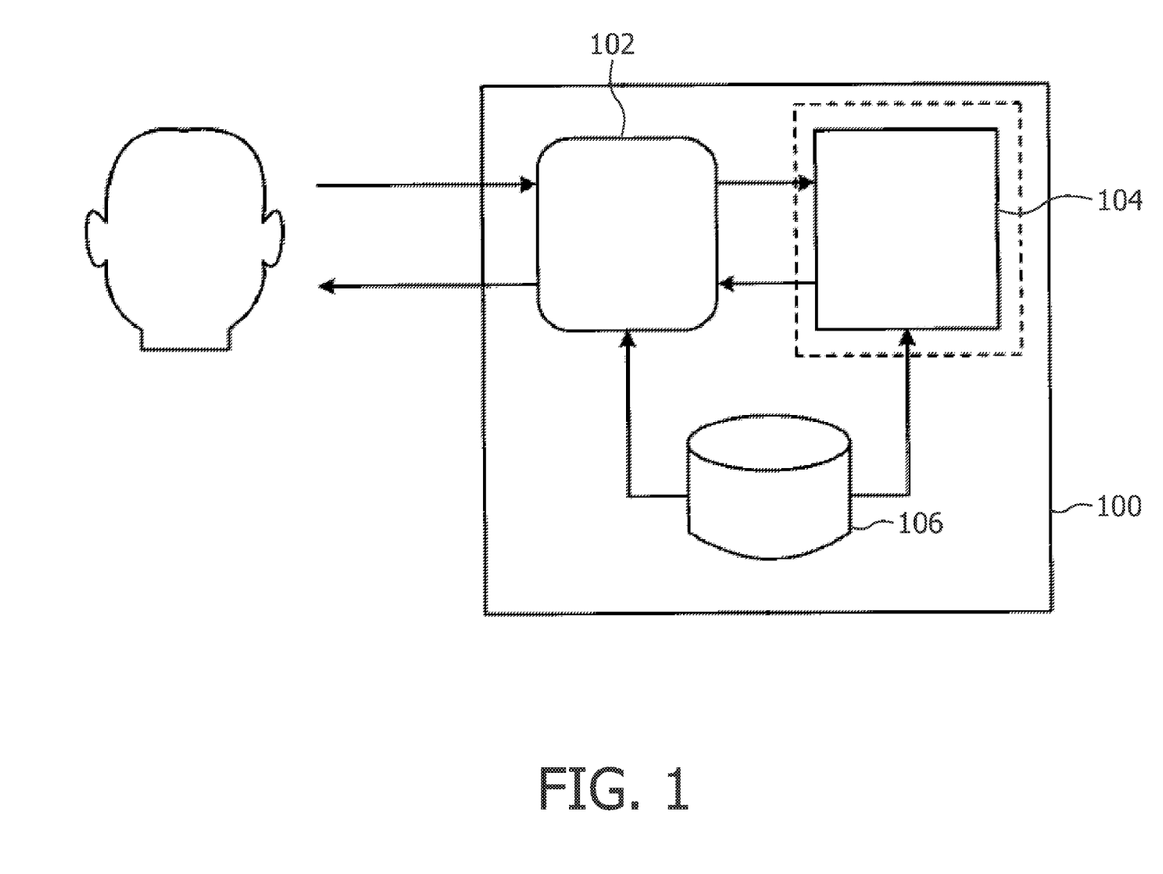
FIG. 1 illustrates the automatic playlist generator according to a preferred embodiment of the present invention.

As illustrated in FIG. 1, the automatic playlist generation system 100 of the preferred embodiment comprises a user interface 102 connected to an algorithm processor 104 and storage device 106.

The user interface 102 retrieves data from the storage device 106 and presents it to the user on a display screen or the like. The user can browse through the files (music files) stored on the storage device 106 which can be sorted by the song attributes such as genre, artist and album. In this way a specific song or specific attribute can be easily located. These attributes can be used to specify restrictions for generation of the playlist. For example, the user can select a specific artist and indicate that at least 50% of the songs in the playlist should be by that artist.

The restrictions (or preferences) input by the user are translated by the user interface 102 into user-defined constraints which are input into the algorithm processor 104 to be used to derive the playlist from the files stored in the storage device 106 to present to the user via the user interface 102.

The storage device 106 consists of all the songs or multimedia files in a digital format, which the user possesses. Along with the files that contain the songs, there is also stored their associated attributes, for example, as listed in Table 1 above.

The user interface 102 also provides feedback on the generated playlist so that the user can refine the playlist by specifying which songs to keep and which ones to change.

To explain the steps of the algorithm according to the preferred embodiment of the present invention, the following formal model of the automatic playlist generator is described below.

As listed in Table 1 above attributes are associated with each song. A song can be given by a finite vector $$s = (v_1, \ldots, v_K) \qquad \text{Eqn (1)}$$

of attribute values, denoting that song s has value $v_k$ ($\in D_k$) for the k-th attribute, where k=1, ..., K. K denotes the number of attributes, and $D_k$ denotes the domain of the k-th attribute, which is a finite set containing all possible values for the k-th attribute. k is the attribute number of an attribute.

A music collection is given by a finite set $$M=\{s_1, \ldots, s_m\} \text{ of m songs.} \qquad \text{Eqn (2)}$$

A playlist is a finite sequence of songs, in which for a given music collection M, a playlist is given by a vector $$p=p_1, \ldots, p_n \qquad \text{Eqn (3)}$$

where $$n \in N \qquad \text{Eqn (4)}$$

and $$p_i \in M, \text{ for } i=1, \ldots, n. \qquad \text{Eqn (5)}$$

So, song $p_i$ is the song at the i-th position in the playlist. A song $p_i$ is in turn a vector of K attribute values. $p_{ik}$ denotes the value of the k-th attribute of the i-th song in playlist p. $M^n$ denotes the set of all possible playlists of n songs from M.

User-defined constraints are restrictions on playlists that determine which songs are allowed to simultaneously occur in a playlist and at which positions. A playlist is said to satisfy a constraint if it meets the restrictions that are defined by that constraint. Otherwise it is said to violate the constraint.

There are three distinguishing types of constraints based on the number of positions on which they are defined: unary, binary, and global constraints. As previously mentioned, a playlist is a sequence of songs and the positions are the places of the songs in that sequence. Unary constraints restrict the songs that are allowed to occur at a single position of the playlist.

Since a song is defined by its attributes, it is logical to define the restrictions in terms of these attributes. It is assumed that there is an attribute that uniquely identifies the songs in the playlist.

Defining constraints based on attributes allows the user to specify their wishes at the song level, for example, that the first song should be "Dancing Queen" by "ABBA". So, without loss of generality it is stated that a unary constraint restricts the attribute values that are allowed to occur at a single position of the playlist.

A binary constraint is defined on two playlist positions. It represents a binary relation between the songs at the specified positions. These constraints can be used to specify an order to the songs in the playlist or some coherence between songs. Examples are that the first two songs of the playlist should not be by the same artist or that the tempo of the song at the first position must be higher than that of the song at the second position.

Finally, global constraints are defined on any number of positions. Examples are that more than half of the songs in the playlist should belong to the genre "Popular" or that the total duration of the playlist should be one hour.

On the basis of these user-defined constraints, the algorithm according to a preferred embodiment of the present invention finds the "best fit" solution playlist. However, it may not be feasible to find a playlist that satisfies all user-defined constraints, or it may be hard to find a feasible solution, if one exists. Therefore, the algorithm, according to an embodiment of the present invention, run by the algorithm processor 104 seeks the optimal solution that is a "best fit" of the user-defined constraints. This is achieved by establishing the extent to which the constraints are violated. Therefore, instead of simply stating that a playlist satisfies or violates a constraint, the quality of the playlists is compared. This is expressed as the function, the penalty function, $f_{pen}$. Evaluating $f_{pen}$ on a set of constraints and a playlist yields a value between 0 and 1 that indicates how much that playlist violates these constraints. A value of 0 means that the playlist satisfies all constraints and a value of 1 means a maximally possible violation of the constraints. The value of the penalty function is calculated by combining the penalties for each of the constraints, $f_{con}$. As for $f_{pen}$, the value for $f_{con}$ is normalized between 0 and 1, where a higher value indicates a greater violation of the constraint. $f_{pen}$ is defined as the average of $f_{con}$, over all constraints in C:

$$f_{pen}(C, p) = \frac{1}{|C|} \sum_{c \in C} f_{con}(c, p) \qquad \text{Eqn (6)}$$

However, this definition assumed that all constraints are considered to be equally important. To introduce a sense of priority among the constraints, a constraint weight function $w_{con}$ on constraints that yields a non-negative value is introduced to express the importance of each constraint in C.

The standard penalty function for each of the constraints in C can be transformed as follows $$\tau_{con}: C \times [0,1] \to [0,1] \qquad \text{Eqn (7)}$$

wherein $\tau_{con}$ is the constraint transformation function. For example, function $\tau_{con}$ can be used to indicate that a small violation of a constraint is relatively severe. In that case, $$\tau_{con}(c,p) = 1 - \exp(-5x) \text{ for that constraint c.} \qquad \text{Eqn (8)}$$

Using the identity function $$\tau_{con}(c,x) = x \qquad \text{Eqn (9)}$$

as a transformation function would simply yield the constraint penalty without transformation.

The penalty function $f_{pen}$ on a set of constraints C and a playlist p can then be defined as the weighted average over all constraints in C:

$$f_{pen}(C, p) = \frac{\sum_{c \in C} \tau_{con}(c, f_{con}(c, p)) \cdot w_{con}(c)}{\sum_{c \in C} w_{con}(c)} \qquad \text{Eqn (10)}$$

Using the definition of $f_{pen}$ in Equation (10), the algorithm of the present invention for a given music collection M, a set of constraints C, a constraint weight function $w_{con}$, a constraint transformation function $\tau_{con}$, and two positive integers $n_{min}$ and $n_{max}$, finds a playlist p of at least $n_{min}$ and at most $n_{max}$ songs from M such that $f_{pen}(C, p)$ is minimized.

The most trivial choice for constraint penalty function $f_{con}$ would be to be equal to 0 if the constraint is satisfied by the playlist, and equal to 1 otherwise. However, this would mean that only two sets of playlists would be discerned: the playlists that satisfy the constraint, and the ones that violate the constraint. To indicate the degree to which a playlist violates a constraint requires a more comprehensive comparison of playlists. Consider the following as an example.

The constraint indicates that no song in the playlist should be by "ABBA". Then a playlist that contains only songs by "ABBA" should result in a higher penalty than one that contains only one song by "ABBA" along with several songs by other artists.

Therefore, in the algorithm according to the embodiment of the present invention, the constraint penalty function $f_{con}$ is defined for each type of constraint. In these constraints, attribute values as well as other values, such as real numbers and integers, are compared. In order to transform these comparisons into penalty values, a difference function $\theta_k$ that returns a value between 0 and 1 indicating the difference between two values in attribute domain $D_k$ is introduced.

The difference function $\theta_k$, which is an infix operator, is defined for each of the attribute types separately. For a nominal attribute with attribute number k, and two values in that attribute's domain, $a,b \in D_k$, the difference function $\theta_k$ is given by $$a \theta_k b = \begin{cases} 0 & \text{if } a = b, \text{ and} \\ 1 & \text{if } a \neq b \end{cases} \qquad \text{Eqn (11)}$$

For attributes on which a total order is defined, that is, ordinal and numerical attributes, a minimum and a maximum value, denoted by $\min_k$ and $\max_k$, respectively, is defined where k is the attribute number of the attribute. Value $\min_k$ is defined as $$\min_k = \min_{v \in D_k} v \qquad \text{Eqn (12)}$$

and value $\max_k$ is defined as $$\max_k = \max_{v \in D_k} v \qquad \text{Eqn (13)}$$

The existence of these minimum and maximum values in the attribute domains is guaranteed because the domains are finite.

On numerical attributes, a difference is already defined, indicated by the infix notation "−". However, this difference does not have a range between 0 and 1, so we take its absolute value and normalize it by dividing it by its range. The minimal difference between two numerical values is 0 and the maximal difference is $\max_k - \min_k$, where it is assumed that this maximal difference is strictly positive.

Therefore, for a numerical attribute with attribute number k, and two values in that attribute's domain, $a,b \in D_k$, the difference function $\theta_k$ is given by $$a \theta_k b = \frac{|a - b|}{\max_k - \min_k} \qquad \text{Eqn (14)}$$

The standard difference, "−", is not defined on ordinal attributes. However, the total order does indicate that some values are closer to each other than others. For example, if for values a, b and c, a<b<c, a is closer to b than to c, because b lies between a and c. The same difference function could be used as for nominal attributes. However, it would preferable to use the total order as this leads to a better resolution, So, instead of having just two possible function values (0 or 1), like for nominal attributes, the difference function can take a multitude of values between 0 and 1. To this end, the values of the ordinal attribute are mapped, with attribute number k, to natural numbers by a function $nat_k: D_k \rightarrow N$ such that it has the following property. For each $a,b \in D_k$ where a<b and there is no $c \in D_k \setminus \{a,b\}$ such that a<c and c<b, it should hold that $nat_k(b) - nat_k(a) = 1$. This results in mapping each value in the attribute's domain to its ordinal number. Assuming that $nat_k(\max_k) - nat_k(\min_k)$ is strictly positive, for an ordinal attribute with attribute number k, and $a,b \in D_k$, the difference function $\theta_k$ is given by $$a \theta_k b = \frac{|nat_k(a) - nat_k(b)|}{nat_k(\max_k) - nat_k(\min_k)} \qquad \text{Eqn (15)}$$

Categorical attributes do not have a total order, but a partial one. Therefore it is not possible to use a function $nat_k$. For categorical attributes some similarity function could be used. Similarity functions could also be based on the contrast model or ratio model or on the product rule model. However, to keep our solution simple, we use the same difference function for categorical attributes as we used for nominal attributes in Equation 11. Finally, there are attributes that represent sets of values, for example, the instruments that are used to perform the song. For the difference between two sets of values, a ratio model is applied, since its range is between 0 and 1. However, the ratio model is used to calculate the similarity between two sets, and not the difference. Therefore, the complement of this similarity value is employed, so that the difference value decreases when the proportional number of elements the sets have in common increases. Therefore, for an attribute that has sets of attribute values in its domain with attribute number k, and $A,B \in D_k$, the difference function $\theta_k$ is given by $$A \theta_k B = 1 - \frac{|A \cap B|}{|A \cup B|} \qquad \text{Eqn (16)}$$

The algorithm according to the preferred embodiment of the present invention comprises two branches, the first branch in which a random change is made to the first solution sequence found and another in which a biased change is made to the first solution sequence. The random branch of the algorithm uses approximate combinatorial optimization. An instance of a combinatorial optimization problem is specified by a finite or countably infinite set of solutions S, also called the solution space, and a cost function $$f: S \rightarrow R \qquad \text{Eqn (17)}$$

which associates with each solution a cost. The algorithm run in the algorithm processor 104 finds a solution with optimal cost. A feature of this algorithm is a neighborhood structure $$N: S \rightarrow 2^S \qquad \text{Eqn (18)}$$

which associates with each solution a set of neighboring solutions that are in some sense near to it. The algorithm of the present invention uses this neighborhood structure to walk efficiently through the solution space. A solution is called locally optimal if there is no neighboring solution with better cost. A solution is called globally optimal if there is no solution in the whole solution space with better cost. The objective of the algorithm is to find such a global optimum.

The random branch of the algorithm according to a preferred embodiment of the present invention walks through the solution space uses an iterative process. In each iteration, the algorithm searches the neighborhood of the current solution for a solution with a better cost as follows:
INITIALIZE s;
repeat
GENERATE s'∈N(s);
if $f(s') < f(s)$ then s:=s'
end;
until $f(s) \leq f(s')$ FOR ALL s'∈N(s)

If such a solution is found, it replaces the current solution. Otherwise, the random branch of the algorithm stops and returns the current solution, which is locally optimal, but not necessarily globally optimal. As an expedient, the algorithm can be restarted with a different initial solution that generates another local optimum. If this procedure is repeated a sufficient number of times, it will always find a globally optimal solution. However, the number of needed restarts may be very high if there are many local optima and the initial solutions are poorly chosen.

To escape local optima and thus eliminate the need for restarting, the iteration above is modified by replacing the deterministic (strict improvement) acceptance criterion by a stochastic criterion, thus circumventing the need of an in-depth study of the problem structure in order to construct more effective neighborhoods, or to design more tailored algorithms (modified algorithm).

This modified form of the algorithm is based on an analogy to the physical annealing of a solid, where the solid is first heated to a certain temperature such that the solid melts. Its particles arrange themselves randomly, and the energy of the system is high. Then, the temperature is gradually lowered to obtain the ground state of the solid. The particles are highly structured and the energy of the system is minimal.

The algorithm encapsulates the concepts of states, energy, and temperature from the annealing process. Solutions correspond to states, and the cost of a solution corresponds to the energy of a state. A control variable t is introduced, which corresponds to the temperature.

The chance of accepting a neighboring solution s' given a solution s is defined by the acceptance probability $$P(s'|s) = \begin{cases} 1 & \text{if } f(s') \leq f(s) \\ \exp\left(\frac{f(s) - f(s')}{t}\right) & \text{otherwise} \end{cases} \quad \text{Eqn (19)}$$

which depends on this control variable. For each value of the control variable, sequences of solutions are generated and evaluated, after which the control variable is lowered. The size of these sequences, the initial value of the control parameter, the decrement function of the control variable, and the stop criterion, all have to be determined before the following random branch algorithm can be applied.

INITIALIZE s, $t_0$, $L_0$;
k:=0;
repeat
for l:=1 to $L_k$ do
begin
GENERATE s'∈N(s);
if $f(s') \leq f(s)$ or $\exp\left(\frac{f(s) - f(s')}{t_k}\right) > \text{random}[0,1]$ then s:=s'
end;
k:=k+1;
CALCULATE LENGTH $L_k$;
CALCULATE CONTROL $t_k$
until STOP CRITERION Further the above iteration requires the definition of a cooling schedule. There exist theoretical schedules that guarantee asymptomatic convergence of the algorithm towards an optimal solution. However, these schedules are not practicable since they require an infinite computing time. This is why much simpler schedules are preferred in practice even if they do not guarantee an optimal solution. One of these simpler cooling schedules is a geometric schedule. In this schedule, all sequence lengths $L_k$ are equal, the initial value for the control parameter $t_0$ is the maximum difference in cost between any two neighboring solutions, and the decrement of the control variable is calculated by $$t_{k+1} = \alpha \cdot t_k, k=0, 1, \ldots, \quad \text{Eqn (20)}$$

where α is a positive constant smaller than but close to 1.

In order to apply the algorithm of the present invention, it is necessary to define an appropriate set of solutions S, a cost function $f$, and a neighborhood structure N. The choice for the solution space and the cost function follows from the definition of the algorithm of the present invention that for a given music collection M, a set of constraints C, a constraint weight function $w_{con}$, a constraint transformation function $\tau_{con}$, and two positive integers $n_{min}$ and $n_{max}$, finds a playlist p of at least $n_{min}$ and at most $n_{max}$ songs from M such that $f_{pen}(C, p)$ is minimized. As the solution space all playlists of at least $n_{min}$ and at most $n_{max}$ songs from M are chosen, that is $$S = \cup_{i=n_{min}}^{n_{max}} M^i \quad \text{Eqn (21)}$$

Then, each solution corresponds to a playlist. The penalty function $f_{pen}$ on the set of constraints C and playlists, defined above, serves as the cost function $f$ on solutions in the algorithm of the present invention.

The algorithm according to a preferred embodiment of the present invention comprises a neighborhood structure in which moves have only a local impact. A move in a neighborhood means switching from one solution to another in that neighborhood. A move in a neighborhood comes down to changing from one playlist to another.

A neighborhood is defined by the changes that are allowed in order to switch to a different playlist. The idea is that by applying small changes to a playlist, the penalty function will also change by a small amount. These penalty changes can be calculated incrementally, and therefore more efficiently. Four neighborhoods are defined in the algorithm of the present invention. The first three neighborhoods are defined by moves that change which songs occur in the playlist. The fourth neighborhood is defined by moves that only change the order of the songs in the playlist.

The first neighborhood is the replace neighborhood, with two parameters: a playlist position, and a song from the music.

Therefore, given a music collection M, the replace neighbors of a playlist $p \in M^n$ are defined by $$N_{replace}(p) = \{\text{replace}(i,s,p) | 1 \leq i \leq n \hat{\ } s \in M\} \quad \text{Eqn (22)}$$

where $$\text{replace}(i, s, p) = p' \Leftrightarrow \begin{cases} p' \in M^n, & \text{and} \\ p'_i = s, & \text{and} \\ p'_l = p_l & \text{forall } 1 \leq l \leq n, l \neq i \end{cases} \quad \text{Eqn (23)}$$

The numbers of neighbors, or the size of a replace neighborhood, depends both on the number of songs in a playlist and on the size of the music collection. The neighborhood consists of all playlists in which only the song at one position is replaced by a song from M, so there are nm neighbors, where m=|M|.

In accordance with Equation (23), the song at the i-th position in p, which is $p_i$, is replaced by song s. This results in playlist p', where the only difference with p is the song at the i-th position.

All playlists in a replace neighborhood have the same number of songs. If only this neighborhood were to be used in the algorithm, the algorithm need only inspect the part of the solution space that contains playlists with an equal number of songs to the initial playlist.

The second neighborhood is the insert neighborhood, with two parameters: a position in the playlist, and a song from the music collection. The resulting playlist contains one song more than the original playlist. To ensure that the resulting playlist is still in the solution space, these moves are only allowed on playlists that have fewer than $n_{max}$ songs.
Therefore, given a music collection M, the insert neighbors of a playlist $p \in M^n$ with $n < n_{max}$ are defined by $$N_{insert}(p) = \{insert(i,s,p) | 1 \leq i \leq n+1 \char`\^ s \in M\} \qquad \text{Eqn (24)}$$

where $$insert(i, s, p) = p' \Leftrightarrow \begin{cases} p' \in M^{n+1} & \text{and} \\ p'_l = p_l & \text{forall } 1 \leq l \leq i, \text{ and} \\ p_i = s, & \text{and} \\ p'_l = p_{l-1} & \text{forall } i \leq l \leq n+1 \end{cases} \qquad \text{Eqn (25)}$$

If $n = n_{max}$, then $N_{insert}(p) = \phi$ \qquad Eqn (26)

The size of an insert neighborhood depends both on the number of songs in a playlist and on the size of the music collection. The neighborhood consists of all playlists in which only one song from M is inserted at one position, so we have $(n+1)m$ neighbors if $n < n_{max}$, and no neighbors otherwise.

An insert move in which song s is inserted into playlist p at the i-th position, results in playlist p', where song s is at the i-th position and all subsequent songs have shifted one position to the right to accommodate for the insertion. Playlist p' contains one song more than p.

The third neighborhood is the delete neighborhood, with one parameter: a position in the playlist. The resulting playlist contains one song fewer than the original playlist. To ensure that the resulting playlist is still in the solution space, these moves are only allowed on playlists that have more than $n_{min}$ songs.
Therefore, given a music collection M, the delete neighbors of a playlist $p \in M^n$ with $n > n_{min}$ are defined by $$N_{delete}(p) = \{delete(i,p) | 1 \leq i \leq n\}, \qquad \text{Eqn (27)}$$

where $$delete(i, p) = p' \Leftrightarrow \begin{cases} p' \in M^{n-1}, & \text{and} \\ p'_l = p_l & \text{forall } 1 \leq l \leq i, \text{ and} \\ p'_l = p_{l+1} & \text{forall } i \leq l \leq n-1 \end{cases} \qquad \text{Eqn (28)}$$

If $n \leq n_{min}$, then $N_{delete}(p) = \phi$

The size of a delete neighborhood depends on the number of songs in a playlist. The neighborhood consists of all playlists that have only one song removed from one position, so we have n neighbors if $n > n_{min}$, and no neighbors otherwise.

The song at the i-th position of playlist p is removed. This results in playlist p', where all songs after position i have shifted one position to the left to accommodate for the deletion. Playlist p' contains one song less than p.

Whereas the moves that defined the previous three neighborhoods changed the set of songs that occur in a playlist, the final neighborhood is defined by moves that only change the order in which the songs appear in the playlist. This neighborhood has two parameters: the two positions in the playlist to be swapped.

Therefore, given a music collection M, the swap neighbors of a playlist $p \in M^n$ are defined by $$N_{swap}(p) = \{swap(i,j,p) | 1 \leq i < j \leq n\}, \qquad \text{Eqn (29)}$$

where $$swap(i, j, p) = p' \Leftrightarrow \begin{cases} p' \in M^n, & \text{and} \\ p'_i = p_j, & \text{and} \\ p'_j = p_i, & \text{and} \\ p'_l = p_l, & \text{forall } 1 \leq l \leq n, i \neq l \neq j \end{cases} \qquad \text{Eqn (30)}$$

The size of a swap neighborhood depends on the number of songs in the playlist. The neighborhood consists of all playlists in which the songs at only two positions have been exchanged.

The song at the i-th position in p, which is $p_i$, is replaced by the song at the j-th position, which is $p_j$, and vice versa. This results in playlist p', where the only difference with p is that the songs at position i and position j have changed places.
The four neighborhoods are combined as follows:

$$N(p) = N_{replace}(p) \cup N_{insert}(p) \cup N_{delete}(p) \cup N_{swap}(p) \qquad \text{Eqn (31)}$$

Insert and delete moves result in a shift of the songs on the playlist positions that follow the position in the move, whereas replace and swap moves only affect the playlist position(s) in the move. Therefore, the difference in penalty can be calculated more efficiently for replace and swap moves. Therefore, to improve the efficiency of evaluating the penalty of the user-defined constraints, probability weights $w_{replace}$, $w_{insert}$, $w_{delete}$, and $w_{swap}$ are introduced for each of the neighborhoods $N_{replace}$, $N_{insert}$, $N_{delete}$, and $N_{swap}$, respectively, in which $0 \leq w_i \leq 1$, and where $\Sigma_i w_i = 1$. These weights determine the probability of generating a neighbor from a particular neighborhood.

To increase the performance of the algorithm of the present invention, that is, to find better playlists faster, in particular, for user-defined constraints that are difficult to satisfy a biased change is used.

In respect of unary constraints, these restrict the attribute values that are allowed to occur at a single position of the playlist. In order to deal with these unary constraints, the concept of a song domain for playlist positions is introduced.

For an instance of the algorithm, a song domain $M_i$ of a position i is a subset of the music collection, $M_i \subset M$, that defines the possible songs that are allowed at that position; for a playlist p, it should hold that $p_i \in M_i$. Therefore the search space for the algorithm can be reduced by reducing the song domains.

Unary constraints can be handled by reducing the song domains of the positions on which these constraints are defined. A unary constraint Unary(i,k,D) specifies that attribute k of the song at position i should be in the set D, i.e., $p_{ik} \in D$. For example, assuming that artist is the third attribute, the unary constraint Unary(1,3,{ABBA}) specifies that the playlist should start with a song by "ABBA".

So, in order to ensure that this unary constraint is satisfied, all songs by artists other than "ABBA" are removed from the song domain of the first position. Song domain reduction can also be used to handle some of the global constraints that are defined using unary constraints. Such a constraint is given as ForEachGlobal($l_1,l_2$,Unary(., k, D)), which specifies that $p_{ik} \in D$, for all $l_1 \leq i \leq l_2$.

Therefore for a given a music collection M, and a set of constraints C, the unary restricted song domain of a playlist position i is defined by $$M_i = \begin{cases} U_i \cap G_i & \text{if } U_i \cap G_i \neq \phi, \text{ and} \\ M & \text{otherwise} \end{cases} \qquad \text{Eqn (32)}$$

where $$U_i = \bigcap_{Unary(i,k,D) \in C} \{s \in M \mid s_k \in D\}, \qquad \text{Eqn (33)}$$

and $$G_i = \bigcap_{ForEachGlobal(l_1,l_2,Unary(.,k,D)) \in C \wedge l_1 \leq i \leq l_2} \{s \in M \mid s_k \in D\} \qquad \text{Eqn (34)}$$

In the case that the set $U_i \cap G_i$ is empty, position i is over-constrained by the unary constraints. In that case, the reduction of that position's song domain is omitted, and the unary constraints is handled on that position by the algorithm described above.

In the case that a position is not over-constrained by unary constraints, playlists that violate any unary constraint on that position are no longer considered. Therefore, the neighborhood structure is reduced.

In the replace neighborhood a new song has to be chosen to be the replacement of the one on some playlist position. In the unary restricted variant, however, not all the songs from the music collection are searched, but only the songs from the song domain of the specified position.

Therefore, given a music collection M, and a set of constraints C, the unary restricted replace neighbors of a playlist $p \in M^n$ are defined by $$\tilde{N}_{replace}(p) = \{replace(i,s,p) \mid 1 \leq i \leq n \hat{\ } s \in M_i\}, \qquad \text{Eqn (35)}$$

where replace(i,s,p) is the same as that defined by Equation (23)

In the insert neighborhood, a song is selected to be inserted on some playlist position. Again, only songs from that position's song domain are allowed to be inserted into the playlist at the specified position. However, because the songs that were on the part of the playlist that starts at the specified position all shift one position to the end of the playlist, it is necessary to consider those positions. Therefore, it is necessary to ensure that the songs are actually in the song domains of the positions that they shift to. To this end, the playlist is divided into two parts, depending on the song domains of the positions. The first part, the head of the playlist, consists of the positions that may have different song domains. The size of this part of the playlist, $n_{head}$, is the maximum playlist position that occurs in the definition of the unary constraints in C.

Therefore, for a set of constraints C, the head of a playlist p, is defined as $(p_1, \ldots, p_{n_{head}})$, where $$n_{head} = \max\{i \mid Unary(i, k, \tilde{D}_k) \in \qquad \text{Eqn (36)}$$
$$C \vee ForEachGlobal(i, l, Unary(., k, \tilde{D}_k)) \in$$
$$C \vee (ForEachGlobal(l, i, Unary(., k, \tilde{D}_k)) \in C \wedge i \neq \infty)\}$$

The second part of the playlist, which starts at position $n_{head}+1$, consists of the consecutive positions whose song domains are identical, the tail of the playlist. The song domains of the positions in the tail are only restricted by ForEachGlobal constraints with ∞ as the second argument. This means that all the song domains are restricted by the same constraints, so they are identical. Now, we can perform insert moves on the positions in the tail of the playlist without having to worry about songs being on a position that they are not allowed to be on because of the song domain reduction.

Therefore, given a music collection M, and a set of constraints C, the unary restricted insert neighbors of a playlist $p \in M^n$ with $n < n_{max}$ are defined by $$\tilde{N}_{insert}(p) = \{insert(i,s,p) \mid n_{head} < i \leq n+1 \hat{\ } s \in M_i\}, \qquad \text{Eqn (37)}$$

where insert(i, s, p) is the same as defined by Equation (25). If $n = n_{max}$, then $\tilde{N}_{insert}(p) = \phi$.

Thirdly, moves in the delete neighborhood cause the same problem as insert moves, in that the shifting of songs as a result of a delete move may violate a unary constraint that was already dealt with by the song domain reduction. Again, this is resolved by only allowing delete moves to be performed on the positions in the tail of the playlist.

Therefore, given a music collection M, and a set of constraints C, the unary restricted delete neighbors of a playlist $p \in M^n$ with $n > n_{min}$ are defined by $$\tilde{N}_{delete}(p) = \{delete(i,p) \mid n_{head} < i \leq n\}, \qquad \text{Eqn (38)}$$

where delete(i, p) is the same as that defined in Equation (28). If $n = n_{min}$, then $\tilde{N}_{delete}(p) = \phi$.

Lastly, in the swap neighborhoods, two positions are selected and the songs on these two positions are swapped. In the unary restricted variant, only swap moves are allowed if the songs on the two specified positions appear in the song domain of both positions.

Therefore, given a music collection M, and a set of constraints C, the unary restricted swap neighbors of a playlist $p \in M^n$ are defined by $$\tilde{N}_{swap}(p) = \{swap(i,j,p) \mid 1 \leq i < j \leq n \hat{\ } p_i \in M_j \hat{\ } p_j \in M_i\}, \qquad \text{Eqn(39)}$$

where swap (i, j, p) is the same as that defined in Equation (30).

Depending on the amount of reduction of the song domains, the neighborhoods are also reduced in the above way. Combining these unary restricted neighborhoods, leads to the unary restricted neighborhood structure $\tilde{N}(p)$ that is used in the algorithm:

$$\tilde{N}(p) = \tilde{N}_{replace}(p) \cup \tilde{N}_{insert}(p) \cup \tilde{N}_{delete}(p) \cup \tilde{N}_{swap}(p) \qquad \text{Eqn (40)}$$

In a further improvement, a distinction is made between constraints whose penalty for a playlist can be affected by only changing the order of the songs in that playlist (ordering constraints), and those, whose penalty cannot be affected by changing the order. A good example of the latter is a Sum-Global constraint on the entire playlist. The sum of the attribute values that occur in the playlist remains the same when only the order is changed, since the set of songs that occur in the playlist does not change. As mentioned previously a distinction is made: the replace, insert and delete neighborhoods are neighborhoods with moves that change the set of songs that occur in a playlist, and the swap neighborhood is a neighborhood with moves that only change the order of the songs in the playlist.

Therefore, given an instance of the algorithm of the present invention, constraint c is an ordering constraint if and only if there is a playlist p of at least $n_{min}$ and at most $n_{max}$ songs, for which there is a playlist $p' \in N_{swap}(p)$ with $f_{con}(c, p) \neq f_{con}(c, p')$.

Basically, all unary and binary constraints are ordering constraints, since they are only defined on one or two playlist positions, respectively. Therefore, it is possible to change the songs on these positions by performing a swap move, and subsequently change the penalty. Using the same reasoning, all global constraints that are not defined on the whole playlist are also ordering constraints. Finally, some global constraints are ordering constraints, irrespective of the positions on which they are defined.

The algorithm according to a preferred embodiment of the present invention uses two separate neighborhoods to handle the ordering constraints. The idea is to use the distinction in constraints and neighborhoods mentioned above to split up the search. In one part the songs that appear in the playlist are changed, and in the other part the optimal order for the current set of songs is found. In the first part, the reselect part, the neighborhood that consists of the replace, insert, and delete neighborhoods is employed. So, for a playlist p, $$N_{reselect}(p) = \tilde{N}_{replace}(p) \cup \tilde{N}_{insert}(p) \cup \tilde{N}_{delete}(p) \quad \text{Eqn (41)}$$

This reselect neighborhood is a special case of the unary restricted neighborhood structure $\tilde{N}$ in which probability weight $w_{swap}$ is equal to 0. So, in the reselect part, the constraints are satisfied by changing the songs that occur in the playlist. Then, the second part of the search is carried out, the reordering part, in which the swap neighborhood is employed to find an optimal order for the set of songs in the playlist, that is, the result of the reselect part of the search. Since only swap moves are employed in this part, only the penalty of the ordering constraints need be taken into account. However, finding the optimal order for a set of songs is sometimes difficult.

To achieve this, a simple procedure as listed below is followed to improve the order of the songs in the current playlist. This procedure, called non-deteriorating reordering (NDR), tries a fixed number of swap moves and accepts them if they do not lead to a higher penalty of the playlist. Only the ordering constraints attribute to this penalty, since they are the only constraints whose penalty can be affected by swap moves. The NDR procedure limits the number of iterations performed, and neighbors with a penalty equal to the current solution are also accepted. The idea is now to alternate between the above two parts to find the optimal set of songs that occur in the playlist in the reselect part, and, once in a while, try to optimize the ordering of that set in the reordering part.

procedure NDR (playlist p, integer i)
begin
for k:=1 to i do
begin
GENERATE p'∈$\tilde{N}_{swap}$(p);
if $f_{pen}(\tilde{C}, p') \leq f_{pen}(\tilde{C}, p)$ then p:=p';
if $f_{pen}(\tilde{C}, p) = 0$ then return p
end;
return p
end
where $\tilde{C} \subset$ is the set of ordering constraints.

In applying the modified algorithm above, the following algorithm results. Parameter β is used to set the amount of moves in the reselect neighborhood that are examined between successive calls of the reordering procedure. Parameter γ is used to control the amount of swap moves that are investigated in the reordering part.
INITIALIZE p, $t_0$, $L_0$;
k:=0;
r:=0;
repeat
for l:=1 to $L_k$ do
begin
if r<β then
begin
GENERATE p'∈$N_{select}$(p);
if $f_{pen}(C, p') \leq f_{pen}(C, p)$ $$\text{or } \exp\left(\frac{f_{pen}(C, p) - f_{pen}(C, p')}{t}\right) > \text{random}[0,1]$$

then p:=p';
r:=r+1
end
else begin
p:=NDR(p,γ);
r:=0
end
end;
k:=k+1;
CALCULATE LENGTH $L_k$;
CALCULATE CONTROL $t_k$
until STOP CRITERION The above algorithm can be made faster. Some constraints are difficult to satisfy and slow the process down. For example, these constraints are not satisfied within five seconds of running time of the algorithm. This is because there is only a few songs in the music collection that lead to a change in penalty for these constraints. For example, if the user-defined constraint is to specify that there should be a certain amount of songs by "ABBA", the only way to change the penalty of that constraint is to add a song by "ABBA" to the playlist or to remove a song by that artist from the playlist. To help the satisfaction of these constraints, a biased change is introduced to provide another degree of bias into the neighbor generation method of the modified algorithm. To a certain extent bias is used in the random change branch of the algorithm by the use of probability weights $w_{replace}$, $w_{insert}$ and $w_{delete}$. The additional bias is incorporated in the bias branch of the algorithm. Selecting bias change can be achieved by voting by the constraints.

In a random move selection, the first step one is to select one of the neighborhoods that comprise the reselect neighborhood, biased by the probability weights $w_{replace}$, $w_{insert}$, and $w_{delete}$. The insert neighborhood is selected only if the current playlist has fewer than $n_{max}$ songs, and the delete neighborhood is selected only if the current playlist has more than $n_{min}$ songs. Then, a playlist position for the move is selected, in a uniformly random manner. For a replace move, that position can be any position in the playlist, for an insert move the position has to be at least $n_{head}+1$ and at most n+1, and for a delete move the position is not allowed to be lower than $n_{head}+1$ or higher than n. If the delete neighborhood is selected in the first step, the move is now complete. In the case of a replace or an insert move, however, it is still necessary to select a song.

If a move is selected by voting, the neighborhood is still selected in a biased random manner in the first step, but a voting method in selecting the position is applied and, in the case of the replace or insert neighborhood, the song. Each of the constraints in C can vote for or against the possible playlist positions of the move. If the move on a position is expected to increase the penalty of a constraint, then that constraint will cast a negative vote on that position. However, if a move on a position is likely to decrease the penalty of a constraint, the constraint will cast a positive vote. Various voting strategies may be employed. These are not described here. The votes from all constraints are tallied, and a playlist position is chosen biased by these votes. So, a position with a lot of positive votes and few negative votes is more likely to be chosen than a position with fewer positive votes and more negative votes. If the replace or the insert neighborhood was selected, a song to add to the playlist also has to be chosen. This is also done by voting, but not all constraints vote (partial constraint voting). Only the constraints that are difficult to satisfy vote. This is because these are the constraints that are hard to satisfy by normal randomized branch of the algorithm. Further, the voting strategies for these constraints are rather efficient, since only few songs in the music collection affect the penalty of the constraints. So, only these songs are voted for, instead of checking all songs in the music collection and see how they affect the constraint.

Now, the move is completed, a neighbor of the current playlist by (partial constraint) voting is generated. This move generation procedure is still followed by an evaluation of the acceptance criterion of the modified algorithm. This results in the algorithm listed below. Because move selection by voting takes more time than random move selection, and because most constraints can be satisfied efficiently by the random branch of the algorithm, partial constraint voting is applied in a certain fraction of the neighborhood generations (e.g. 10%), denoted by $\delta$.

INITIALIZE p, $t_0$, $L_0$;
k:=0;
r:=0;
repeat
for l:=1 to $L_k$ do
begin
if r<$\beta$ then
begin
if $\delta$>random[0,1] then
GENERATE p'$\in N_{select}(p)$ BY VOTING
else GENERATE RANDOM p'$\in N_{select}(p)$;
if $f_{pen}(C, p') \leq f_{pen}(C, p)$ $$\text{or } \exp\left(\frac{f_{pen}(C, p) - f_{pen}(C, p')}{t}\right) > \text{random}[0,1]$$

then p:=p';
r:=r+1
end
else begin
p:=NDR(p,$\gamma$);
r:=0
end
end;
k:=k+1;
CALCULATE LENGTH $L_k$;
CALCULATE CONTROL $t_k$
until STOP CRITERION The above combination of random change and biased change has the benefit that constraints that are easily handled by random change are handled efficiently, whereas the 'difficult' constraints are handled effectively by use of the biased change.

Although a preferred embodiment of the method and apparatus of the present invention has been illustrated in the accompanying drawing and described in the forgoing detailed description, it will be understood that the invention is not limited to the embodiment disclosed, but is capable of numerous variations, modifications without departing from the scope of the invention as set out in the following claims.

The invention claimed is:

1. A processor implemented method of deriving a final target sequence of a plurality of elements in accordance with a plurality of user-defined constraints, the method comprising acts of:
    generating a first sequence of elements;
    evaluating a penalty of the first sequence, the penalty indicating an extent of violation by the elements of the plurality of user-defined constraints; and
    deriving a final target sequence by repeatedly:
        generating a second sequence by making a change to at least one element of the first sequence, the change is selected from at least one of a random change and a biased change, the biased change reducing the extent of violation indicated by the penalty of at least one of the plurality of user-defined constraints,
        evaluating the penalty of the second sequence, and
        replacing the first sequence with a target sequence, such that if the random change is made, the penalties of the first and second sequence are compared and one with the penalty that has a smaller extent of violation is selected as the target sequence, and if the biased change is made, the second sequence is selected as the target sequence,
    wherein at least one iteration includes making a biased change.

2. The method according to claim 1, wherein, the acts are repeated, until a penalty of the target sequence is minimized.

3. The method according to claim 1, wherein, the acts are repeated a predetermined number of times.

4. The method according to claim 1, wherein the biased change is determined by user-defined constraint votes.

5. The method according to claim 1, wherein changing at least one element of the first sequence includes at least one of: changing a position of the at least one element in the first sequence, replacing the at least one element with a new element, deleting the at least one element, and inserting a new element.

6. The method according to claim 5, wherein the new position of the at least one element is selected by voting of the plurality of user-defined constraints.

7. The method according to claim 5, wherein the new element is selected by voting of the plurality of user-defined constraints.

8. The method according to claim 6, wherein the voting is performed by a predetermined subset of the plurality of user-defined constraints.

9. The method according to claim 8, wherein the predetermined subset of the plurality of user-defined constraints comprises types of user-defined constraints that cannot be satisfied by a random change.

10. The method according to claim 1 wherein a plurality of user-defined constraints are weighted such that the first and second penalty is calculated on the basis of the weighted constraints.

11. The method according to claim 1, wherein the elements are stored in a library and the method further comprising an act of selecting each element for the first and second sequence from the library.

12. The method according to claim 11, wherein the elements selected from the library are selected from a subset of the library defined by at least one user-defined constraint.

13. The method according to claim 1 wherein the elements of the first sequence are selected on the basis of similarity to a seed element.

14. The method according to claim 1, wherein the target sequence comprises a sequence of elements arranged in a predetermined order in accordance with at least one user-defined constraint.

15. The method according to claim 1, wherein the target sequence is a music playlist and the elements are music files.

16. A device for automatically deriving a final target sequence of a plurality of elements in accordance with a plurality of user-defined constraints, the device comprising:
  a user interface for inputting a plurality of restrictions for the target sequence and translating the restrictions into the plurality of user-defined constraints;
  a storage device for storing the plurality of elements; and
  a processor for automatically generating the target sequence by:
  generating a first sequence of elements;
  evaluating a penalty of the first sequence, the penalty indicating an extent of violation by the elements of the plurality of user-defined constraints; and
  deriving a final target sequence by repeatedly:
    generating a second sequence by making a change to at least one element of the first sequence, the change is selected from at least one of a random change and a biased change, the biased change reducing the penalty of at least one of the plurality of user-defined constraints,
    evaluating the penalty of the second sequence, and
    replacing the first sequence with a target sequence, such that if the random change is made, the penalties of the first and second sequence are compared and one with the penalty that has a smaller extent of violation is selected as the target sequence, and if the biased change is made, the second sequence is selected as the target sequence
  wherein at least one iteration includes making a biased change.

17. The device according to claim 16, wherein the processor repeats the acts, until the penalty of the target sequence is minimized.

18. The device according to claim 16, wherein the processor repeats the acts a predetermined number of times.

19. The device according to claim 15, wherein the processor selects elements from a subset of the library defined by at least one user-defined constraint.

20. The method according to claim 1, wherein the acts for achieving the method are carried out by a computer program embodied on a computer readable product.

21. The device according to claim 15, wherein the device is an automatic playlist generator.

* * * * *